(12) United States Patent
Ruffini et al.

(10) Patent No.: US 9,948,419 B2
(45) Date of Patent: Apr. 17, 2018

(54) METHOD AND APPARATUS FOR DETERMINING PROPAGATION DELAY IN A COMMUNICATIONS NETWORK

(71) Applicant: Telefonaktiebolaget LM Ericsson (publ), Stockholm (SE)

(72) Inventors: Stefano Ruffini, Pisa (IT); Fabio Cavaliere, Pisa (IT); Stefano Stracca, Pisa (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/309,509

(22) PCT Filed: May 8, 2014

(86) PCT No.: PCT/EP2014/059417
§ 371 (c)(1),
(2) Date: Nov. 8, 2016

(87) PCT Pub. No.: WO2015/169363
PCT Pub. Date: Nov. 12, 2015

(65) Prior Publication Data
US 2017/0180070 A1    Jun. 22, 2017

(51) Int. Cl.
*H04B 10/00* (2013.01)
*H04J 3/06* (2006.01)
(Continued)

(52) U.S. Cl.
CPC .......... *H04J 3/0658* (2013.01); *H04B 1/7073* (2013.01); *H04B 7/2125* (2013.01);
(Continued)

(58) Field of Classification Search
CPC ...... H04J 3/0658; H04J 3/0661; H04J 3/0644; H04J 3/0647; H04J 3/0667; H04J 3/0676;
(Continued)

(56) References Cited

U.S. PATENT DOCUMENTS 6,353,604 B2 *  3/2002  Grimwood ............ H04J 3/0682
                                                                 370/335
7,072,432 B2 *  7/2006  Belcea .................. H04J 3/0667
                                                                 370/235
(Continued)

FOREIGN PATENT DOCUMENTS

EP          1802014 A1    6/2007
WO     2012048975 A1    4/2012

OTHER PUBLICATIONS

CPRI, "Common Public Radio Interface (CPRI); Interface Specification", CPRI Specification V6.0, Aug. 30, 2013, 1-128.
(Continued)

*Primary Examiner* — Hibret Woldekidan
(74) *Attorney, Agent, or Firm* — Murphy, Bilak & Homiller, PLLC

(57) ABSTRACT

A method and apparatus for determining propagation delay of a first path and or of a second path which connect a first transceiver unit associated with a first clock to a second transceiver unit associated with a second clock in a communications network. The apparatus comprises a control unit configured to cause the first transceiver unit to transmit a first signal to the second transceiver unit over the first path and to receive a reply to the first signal from the second transceiver unit over the second path, and to transmit a second signal to the second transceiver unit over the second path and to receive a reply to the second signal from the second transceiver unit over the first path. The apparatus further comprises a receiving unit configured to receive a first time reference representing the time of transmission of the first signal from the first transceiver unit, a second time reference representing the time of receipt of the first signal at the second transceiver unit, a third time reference representing the time of transmission of the reply to the second signal from the second transceiver unit and a fourth time
(Continued)

reference representing the time of receipt of the reply to the second signal at the first transceiver unit. The apparatus further comprises a determining unit configured to determine a propagation delay of the first path and or of the second path using the first time reference, the second time reference, the third time reference and the fourth time reference.

25 Claims, 5 Drawing Sheets

(51) Int. Cl.
| | | |
|---|---|---|
| H04B 7/26 | (2006.01) | |
| H04B 10/2575 | (2013.01) | |
| H04B 1/7073 | (2011.01) | |
| H04B 7/212 | (2006.01) | |
| H04L 12/26 | (2006.01) | |

(52) U.S. Cl.
CPC ..... *H04B 7/2678* (2013.01); *H04B 10/25753* (2013.01); *H04J 3/0644* (2013.01); *H04J 3/0647* (2013.01); *H04J 3/0667* (2013.01); *H04J 3/0676* (2013.01); *H04L 43/106* (2013.01); *H04B 2215/065* (2013.01)

(58) Field of Classification Search
CPC ...... H04J 3/0673; H04J 3/0697; H04J 3/0682; H04B 1/7073; H04B 7/2125; H04B 7/2678; H04B 10/25753; H04B 2215/065; H04B 10/40; H04B 10/2503; H04B 10/1127; H04B 10/0775; H04B 10/0795; H04B 1/7183; H04L 43/106; H04Q 2011/0045
USPC ................. 398/155, 154, 161, 135–139, 25
See application file for complete search history.

(56) References Cited

U.S. PATENT DOCUMENTS

| | | | | |
|---|---|---|---|---|
| 8,526,333 B2* | 9/2013 | Li | ............................ | H04J 3/085 370/255 |
| 8,576,778 B2* | 11/2013 | Irvine | ................... | H04J 3/0641 370/328 |
| 8,600,239 B2* | 12/2013 | Mani | ................... | H04J 14/0272 398/154 |
| 8,842,994 B2* | 9/2014 | Lanzone | ................. | H04J 3/065 370/395.62 |
| 8,873,947 B2* | 10/2014 | Libeskind | .......... | H04B 10/0775 398/13 |
| 8,913,895 B1* | 12/2014 | Chiang | ................. | H04J 3/0682 398/155 |
| 9,166,681 B2* | 10/2015 | Cavaliere | ............... | H04B 10/07 |
| 9,357,516 B2* | 5/2016 | Irvine | ................... | H04J 3/0641 |
| 9,584,217 B2* | 2/2017 | Bottari | ............... | H04B 10/0775 |
| 9,584,218 B2* | 2/2017 | Lins de Medeiros | ............ | H04L 41/0681 |
| 9,628,259 B2* | 4/2017 | Lanzone | ................. | H04J 3/065 |
| 9,705,770 B2* | 7/2017 | Cavaliere | ............... | H04B 10/07 |
| 2004/0208600 A1* | 10/2004 | Guenter | ............... | H04B 10/806 398/135 |
| 2007/0147562 A1* | 6/2007 | Eidson | .................. | H04J 3/0667 375/354 |
| 2009/0086764 A1* | 4/2009 | Lee | ....................... | H04J 3/0667 370/503 |
| 2010/0021174 A1* | 1/2010 | Truong | .................. | H04B 10/40 398/101 |
| 2010/0158530 A1* | 6/2010 | Soto | ....................... | H04B 10/40 398/79 |
| 2013/0100948 A1* | 4/2013 | Irvine | ................... | H04J 3/0632 370/350 |
| 2013/0202291 A1 | 8/2013 | Cavaliere et al. | | |
| 2017/0195110 A1* | 7/2017 | Ruffini | ................. | H04L 7/0016 |

OTHER PUBLICATIONS

Exel, Reinhard, "Mitigation of Asymmetric Link Delays in IEEE 1588 Clock Synchronization Systems", IEEE Communications Letters, vol. 18, No. 3, Mar. 2014, 507-510.
Unknown, Author, "Time and Phase Synchronization Aspects of Packet Networks", ITU-T G.8271/Y.1366 (Feb. 2012), Series G: Transmission Systems and Media, Digital Systems and Networks, Packet Over Transport Aspects—Quality and Availability, Series Y: Global Information Infrastructure, Internet Protocol Aspects and Next-Generation Netw, Feb. 2012, 1-32.

* cited by examiner

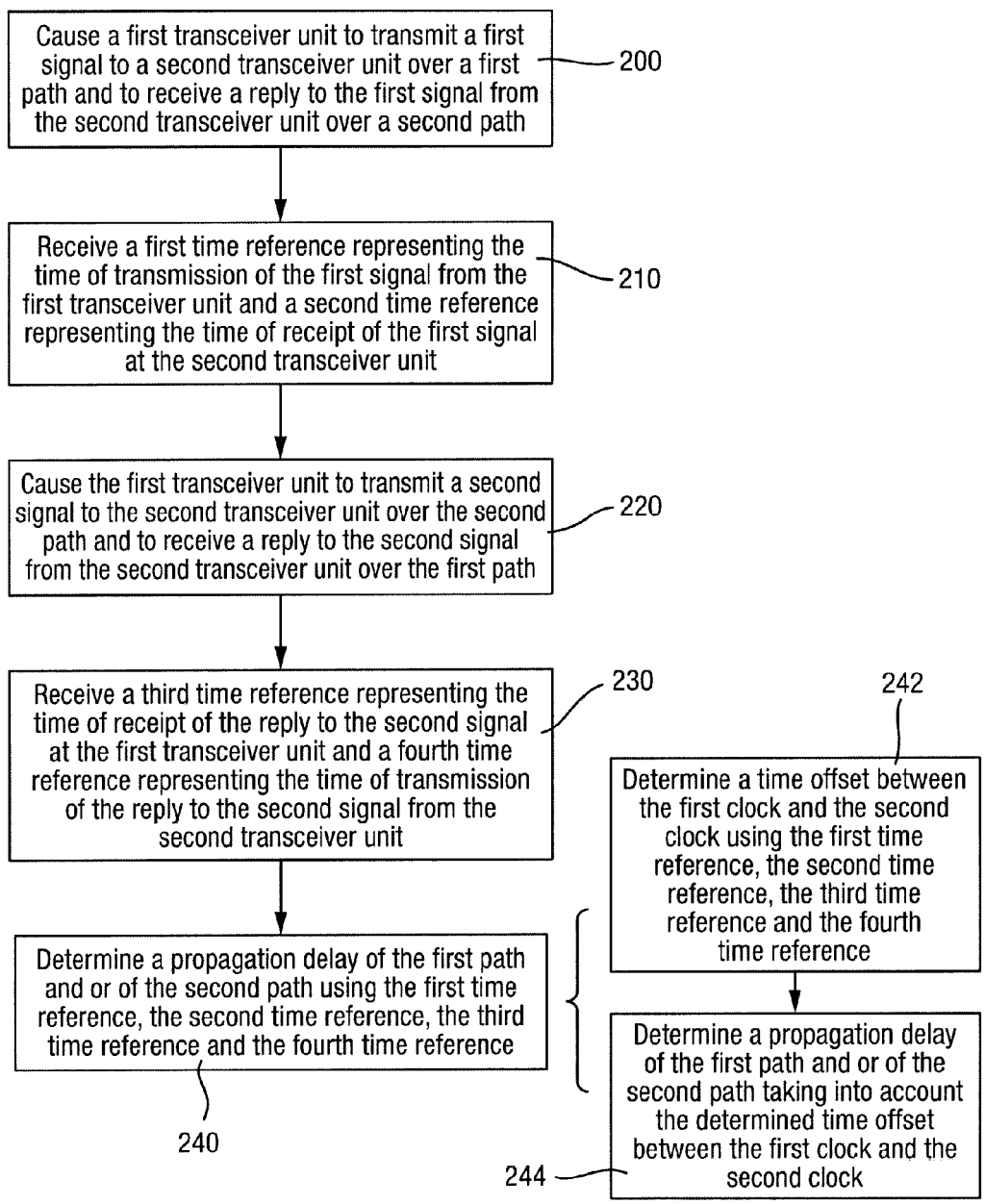

Determine a propagation delay of the first path:

Determine a propagation delay of the second path:

METHOD AND APPARATUS FOR DETERMINING PROPAGATION DELAY IN A COMMUNICATIONS NETWORK

TECHNICAL FIELD

The present invention relates to a method and apparatus for determining propagation delay of a first path and or of a second path which connect a first transceiver unit associated with a first clock to a second transceiver unit associated with a second clock in a communications network. The present invention also relates to a computer program product, a node for a communications network and a communications base station.

BACKGROUND

FIG. 1 illustrates a communications base station 10. The communications base station 10 comprises a radio equipment controller (REC) 15, which may also be referred to as a baseband unit, and a radio equipment (RE) 20, which may be referred to as a remote radio unit. The radio equipment 20 is coupled to a radio antenna 25. Although not shown in FIG. 1, the radio equipment controller 15 is associated with a first clock, and the radio equipment 20 is associated with a second (different) clock. The radio equipment controller 15 and the radio equipment 20 may be connected by one or more communications links, such as optical fibres.

In this example, the radio equipment controller 15 and the radio equipment 20 communicate according to the CPRI (Common Public Radio Interface) protocol. The CPRI protocol requires that the propagation delay between the radio equipment controller 15 and the radio equipment 20 is predicted. The CPRI protocol assumes that the downlink propagation delay (i.e., with reference to FIG. 1, T12, the time it takes a signal to travel from REC 15 to RE 20) is the same as the uplink propagation delay (i.e. with reference to FIG. 1, T34, the time it takes a signal to travel from RE 20 to REC 15). Thus, the CPRI protocol calculates the propagation delay between the radio equipment controller 15 and the radio equipment 20 as the round trip delay of a signal between the radio equipment controller 15 and the radio equipment 20 (i.e. with reference to FIG. 1, T14), minus any known processing delay at the radio equipment 20 (i.e. Toffset), divided by two.

However, in practice, the uplink propagation delay may not be the same as the downlink propagation delay (i.e. the links may be asymmetric). This may be the case where the uplink and downlinks travel over respective communications links, for example over respective optical fibres, which have different lengths. This may also be the case in WDM (wavelength division multiplexed) networks, where the uplink and the downlink may travel through the same optical fibre (over different wavelength channels) but through respective add/drop optical filter arrangements, which may introduce asymmetries.

The asymmetry between the uplink/downlink may be calculated, by determining the propagation delay of each of the links manually. However, this process is time consuming and costly, particularly since a communications base station 10 may comprise several RECs 15 and several REs 20, each located at remote locations.

SUMMARY

According to the present invention there is provided an apparatus for determining propagation delay of a first path and or of a second path which connect a first transceiver unit associated with a first clock to a second transceiver unit associated with a second clock in a communications network. The apparatus comprises a control unit configured to cause the first transceiver unit to transmit a first signal to the second transceiver unit over the first path and to receive a reply to the first signal from the second transceiver unit over the second path. The control unit is further configured to cause the first transceiver unit to transmit a second signal to the second transceiver unit over the second path and to receive a reply to the second signal from the second transceiver unit over the first path. The apparatus further comprises a receiving unit configured to receive a first time reference representing the time of transmission of the first signal from the first transceiver unit, a second time reference representing the time of receipt of the first signal at the second transceiver unit, a third time reference representing the time of transmission of the reply to the second signal from the second transceiver unit and a fourth time reference representing the time of receipt of the reply to the second signal at the first transceiver unit. The apparatus further comprises a determining unit configured to determine a propagation delay of the first path and or of the second path using the first time reference, the second time reference, the third time reference and the fourth time reference.

Thus, advantageously, embodiments of the present invention enable the propagation delay of the first path and or of the second path to be determined (and therefore the asymmetry between the paths to be determined) automatically. Furthermore, implementations of the solution of the present invention may, advantageously, be less complex and more cost effective than alternative solutions.

In a preferred embodiment of the present invention, the determining unit comprises a first determining unit and a second determining unit. The first determining unit is configured to determine a time offset between the first clock and the second clock using the first time reference, the second time reference, the third time reference and the fourth time reference. The second determining unit is configured to determine the propagation delay of the first path and or of the second path taking into account the determined time offset between the first clock and the second clock.

For example, in an embodiment of the present invention, the second determining unit may be configured to determine the propagation delay of the first path, by determining a difference between the second time reference and the first time reference taking into account the determined time offset between the first clock and the second clock, or by determining a difference between the fourth time reference and the third time reference taking into account the determined time offset between the first clock and the second clock.

In addition or alternatively, the receiving unit may be further configured to receive a fifth time reference representing the time of transmission of the reply to the first signal from the second transceiver unit and a sixth time reference representing the time of receipt of the reply to the first signal at the first transceiver unit, or to receive a seventh time reference representing the time of transmission of the second signal from the first transceiver unit and an eighth time reference representing the time of receipt of the second signal at the second transceiver unit.

Further, the second determining unit may be configured to determine the propagation delay of the second path, by determining a difference between the sixth time reference and the fifth time reference taking into account the determined time offset between the first clock and the second clock, or by determining a difference between the eighth time reference and the seventh time reference taking into account the determined time offset between the first clock and the second clock.

In a preferred embodiment of the present invention, the control unit may be configured to cause the first transceiver unit to transmit the first signal at a first wavelength and to transmit the second signal at a second, different wavelength. In this embodiment, the communications network may be a WDM network.

In addition or alternatively, the control unit may be configured to cause a switch arrangement to selectively pass the first signal over the first path and to selectively pass the second signal over the second path. Optionally, the control unit may further be configured to cause a switch arrangement to selectively pass the reply to the first signal to the first transceiver unit, and to selectively pass the reply to the second signal to the first transceiver unit.

In a preferred embodiment of the present invention, the control unit may further be configured to cause the second transceiver unit to receive the first signal over the first path and to transmit the reply to the first signal over the second path, and to receive the second signal over the second path and to transmit the reply to the second signal over the first path. Advantageously, this may enable the operation of the second transceiver unit to be easily coordinated with the operation of the first transceiver unit.

There is further provided a node for a communications network comprising an apparatus for determining propagation delay of a first path and or of a second path which connect a first transceiver unit associated with a first clock to a second transceiver unit associated with a second clock in a communications network as described above. The node may further comprise the first transceiver unit.

There is further provided a communications base station comprising an apparatus for determining propagation delay of a first path and or of a second path which connect a first transceiver unit associated with a first clock to a second transceiver unit associated with a second clock in a communications network as described above.

There is also provided a method for determining propagation delay of a first path and or of a second path which connect a first transceiver unit associated with a first clock to a second transceiver unit associated with a second clock in a communications network. The method comprises causing the first transceiver unit to transmit a first signal to the second transceiver unit over the first path and to receive a reply to the first signal from the second transceiver unit over the second path. The method further comprises causing the first transceiver unit to transmit a second signal to the second transceiver unit over the second path and to receive a reply to the second signal from the second transceiver unit over the first path. The method further comprises receiving a first time reference representing the time of transmission of the first signal from the first transceiver unit, a second time reference representing the time of receipt of the first signal at the second transceiver unit, a third time reference representing the time of transmission of the reply to the second signal from the second transceiver unit and a fourth time reference representing the time of receipt of the reply to the second signal at the first transceiver unit. The method further comprises determining a propagation delay of the first path and or of the second path using the first time reference, the second time reference, the third time reference and the fourth time reference.

In a preferred embodiment, the second time reference is transmitted from the second transceiver unit to the first transceiver unit in the reply to the first signal, and the third time reference is transmitted from the second transceiver unit to the first transceiver unit in the reply to the second signal. Advantageously, this may enable the necessary time references to be collated in a bandwidth efficient manner.

The first signal, the reply to the first signal, the second signal and the reply to the second signal may be CPRI signals.

Thus, advantageously, in this embodiment, the propagation delay of the first path and or of the second path may be determined whilst the first and second transceiver units are transmitting/receiving CPRI traffic.

There is further provided a computer program product configured to, when run on a computer, perform the method described above. The computer program product may be stored on a computer-readable medium. The computer program product may in any form such as in the form of a downloadable signal.

BRIEF DESCRIPTION OF THE DRAWINGS

Embodiments of the present invention will now be described with reference to the accompanying drawings, in which:

FIG. 2 is a flow chart showing a method according to an embodiment of the present invention;

DETAILED DESCRIPTION

FIG. 2 is a flow chart of a method of determining propagation delay of a first path and/or of a second path which connect a first transceiver unit, associated with a first clock, to a second transceiver unit, associated with a second clock, in a communications network according to an embodiment of the present invention. The communications network may be any type of network such as, but not exclusively, an optical communications network.

The method comprises, at step 200, causing the first transceiver unit to transmit a first signal to the second transceiver unit over the first path and to receive a reply to the first signal from the second transceiver unit over the second path. The method further comprises, at step 210, receiving a first time reference representing the time of transmission of the first signal from the first transceiver unit and a second time reference representing the time of receipt of the first signal at the second transceiver unit.

The method further comprises, at step 220, causing the first transceiver unit to transmit a second signal to the second transceiver unit over the second path and to receive a reply to the second signal from the second transceiver unit over the first path. The method further comprises, at step 230, receiving a third time reference representing the time of transmission of the reply to the second signal from the second transceiver unit and a fourth time reference representing the time of receipt of the reply to the second signal at the first transceiver unit.

The method further comprises, at step 240, determining a propagation delay of the first path and or of the second path using the first time reference, the second time reference, the third time reference and the fourth time reference.

Note that steps 200 and 220 may be performed in any order.

The first time reference and the fourth time reference are determined based on (or using) the first clock. The second time reference and the third time reference are determined based on (or using) the second clock.

The term "propagation delay" of the first path and or of the second path is intended to refer to the time it takes, or it is expected to take, a signal to traverse a respective one of the paths. The propagation delay of the first path may be different from the propagation delay of the second path.

In a preferred embodiment of the present invention, step 240 comprises, at step 242, determining a time offset between the first clock and the second clock using the first time reference, the second time reference, the third time reference and the fourth time reference, and, at step 244, determining the propagation delay of the first path and or of the second path taking into account the determined time offset between the first clock and the second clock.

Figure 3A:
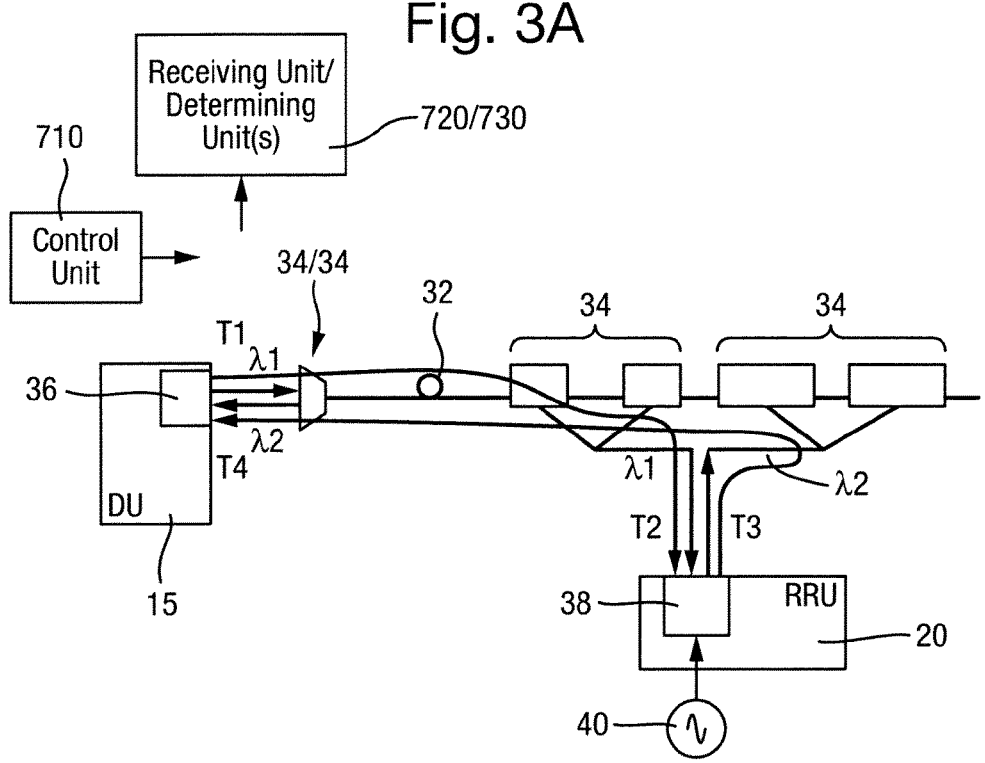
FIGS. 3a and 3b illustrate an example of the present invention.
Figure 3B:
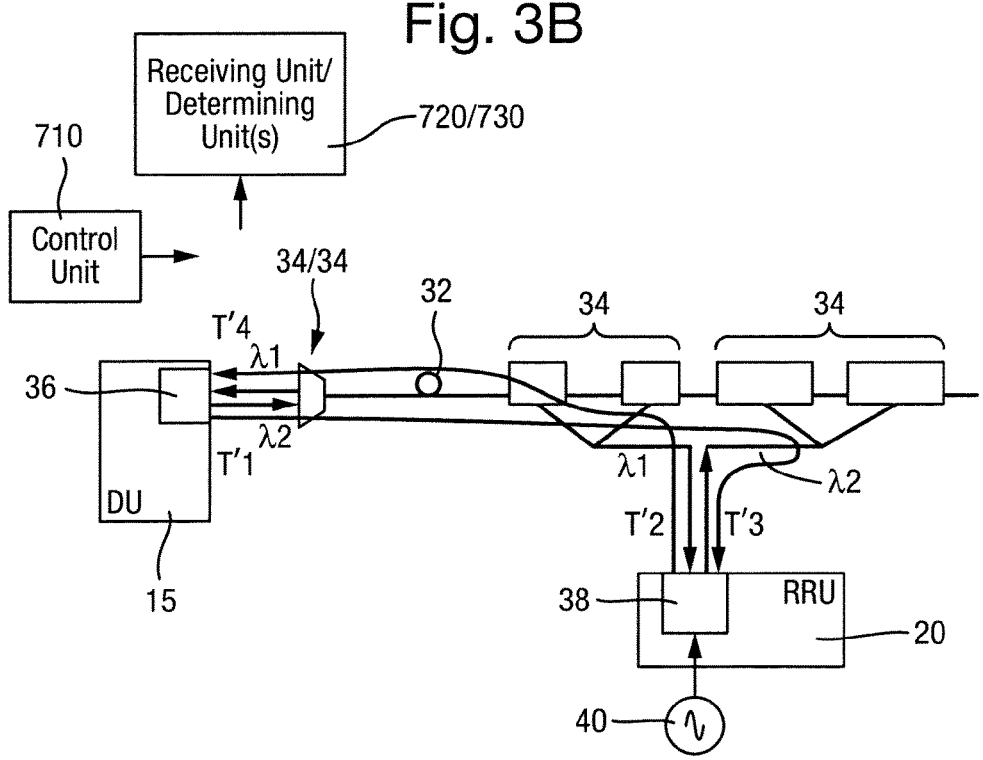

In order to aid understanding, FIGS. 3a and 3b illustrate an example of the present invention.

In this example, the communications network is an optical communications network, and in particular a WDM (wavelength division multiplexed) network. In this example, the first path and the second path pass through the same optical fibre 32 (along respective wavelength channels), but through respective add/drop optical filter arrangements 34, which may introduce asymmetries.

In FIG. 3a, as shown by the arrows, a signal (referred to as a first signal) is transmitted from a first transceiver unit 36 to a second transceiver unit 38 over the first path, and the reply to the signal from the second transceiver unit 38 is transmitted from the second transceiver unit 38 to the first transceiver unit 36 over the second path.

Thus, in this example, the first signal is at a first wavelength, and the reply to the first signal is at a second (different) wavelength.

In FIG. 3b, as also shown by the arrows, the opposite scenario occurs. Effectively, the uplink and downlink are reversed. A signal (referred to as a second signal) is transmitted from the first transceiver unit 36 to the second transceiver unit 38 over the second path, and the reply to the signal from the second transceiver unit 38 is transmitted from the second transceiver unit 38 to the first transceiver unit 36 over the first path.

Thus, in this example, the second signal is at the second wavelength, and the reply to the second signal is at the first wavelength.

Note that, as indicated above, the first signal and the reply to the first signal may be transmitted/received, before the second signal and the reply to the second signal are transmitted/received, or vice versa.

In each of FIGS. 3a and 3b, four time references are indicated: T1, T2, T3 and T4 in FIG. 3a, and T1', T2', T3' and T4' in FIG. 3b.

With reference to FIG. 3a, T1 represents the time of transmission of the first signal from the first transceiver unit 36. T1 is determined based on the first clock (not shown) associated with the first transceiver unit 36, and may be generated by the first transceiver unit 36. This clock may be referred to as a master clock. T2 represents the time of receipt of the first signal at the second transceiver unit 38. T2 is determined based on a second (different) clock, in this example local clock 40, associated with the second transceiver unit 38. T2 may be generated by the second transceiver unit 38. T3 represents the time of transmission of the reply to the first signal from the second transceiver unit 38. Again, T3 is determined based on local clock 40. T3 may be generated by the second transceiver unit 38. T4 represents the time of receipt of the reply to the first signal at the first transceiver unit 36. T4 is determined based on the first clock (not shown), and may be generated by the first transceiver unit 36.

Similarly, with reference to FIG. 3b, T1' represents the time of transmission of the second signal from the first transceiver unit 36. T2' represents the time of receipt of the second signal at the second transceiver unit 38. T3' represents the time of transmission of the reply to the second signal from the second transceiver unit 38, and T4' represents the time of receipt of the reply to the second signal at the first transceiver unit 36. T1' and T4' are determined based on the first clock, and T2' and T3' are determined based on the second clock, local clock 40. T1' and T4' may be generated by the first transceiver unit 36. T2' and T3' may be generated by the second transceiver unit 38.

The time references T2 and T3, and T2' and T3' may be transmitted to the first transceiver unit 36 by the second transceiver unit 38 in the replies to the first and second signals respectively. For example, where the replies to the first and second signals each include one or more packets comprising a header portion and a packet portion, the time references may be included in the header portions of the packets.

All eight references are not, however, required in order to determine the propagation delay of the first path and or of the second path, according to embodiments of the present invention.

Referring to the flow chart of FIG. 2, it will be appreciated that the "first time reference" in FIG. 2 is T1, and the "second time reference" is T2. The "third time reference" is T3' and the "fourth time reference" is T4'.

Thus, these time references relate to the first signal and the reply to the second signal, which both travel over the same path (the first path), but in opposite directions.

Thus, if it is assumed that the second clock is offset from the first clock by Toff, then the following applies:

$$T4=(T3+T\text{off})=T2'-(T1'-T\text{off}).$$

Note that this equation is based on the assumption that the propagation delay along the first path is the same in both transmission directions.

Thus, Toff may be evaluated as follows:

$$T\text{off}=[(T4-T3)-(T2'-T1')]/2$$

The propagation delay of the first path and or of the second path may now therefore be determined, using the determined time offset between the first clock and the second clock (40).

Figure 4A:
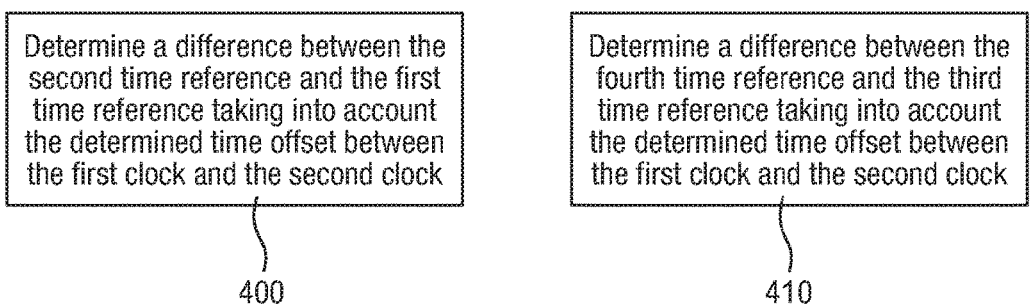
FIGS. 4a and 4b show flow charts of methods according to preferred embodiments of the present invention.

FIG. 4a illustrates two methods for determining the propagation delay of the first path, taking into account the determined time offset between the first clock and the second clock (40).

As shown in FIG. 4a, at 400, the propagation delay of the first path may be determined by determining a difference between the second time reference (T2) and the first time reference (T1) taking into account the determined time offset between the first clock and the second clock (40). For example, from:

$$T\text{path1}=(T2+T\text{off})-T1.$$

Or, as shown at 410 in FIG. 4a, the propagation delay of the first path may be determined by determining a difference between the fourth time reference (T4') and the third time reference (T3') taking into account the determined time offset between the first clock and the second clock (40). For example, from:

$$Tpath1=T4'-(T3'+Toff).$$

Figure 4B:
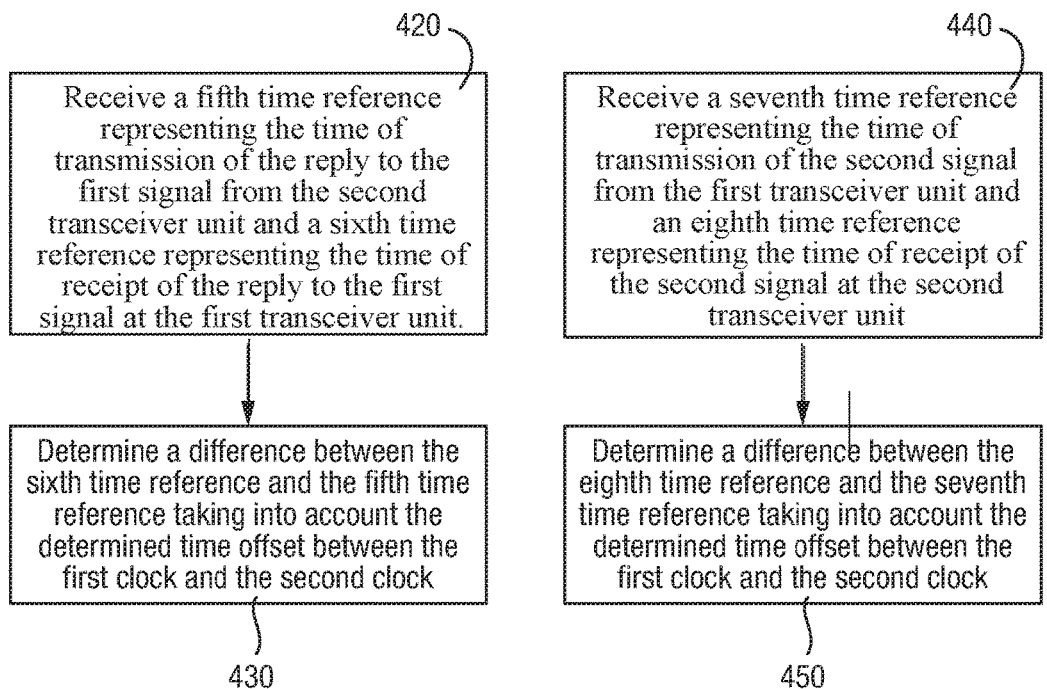

Similarly, as indicated in FIG. 4b, the propagation delay of the second path may be determined based on the other time references shown in FIG. 3a/3b (i.e. from T3 and T4, relating to the reply to the first signal, which is transmitted over the second path, or from T1' and T2', relating to the second signal, which is also transmitted over the second path).

For purposes of clarity, in FIG. 4b, T3 is referred to as a "fifth time reference", T4 as a "sixth time reference", T1' as a "seventh time reference" and T2' as an "eighth time reference".

Thus, as indicated in FIG. 4b, at 420, the method may further comprise receiving a fifth time reference (T3) representing the time of transmission of the reply to the first signal from the second transceiver unit 38 and a sixth time reference (T4) representing the time of receipt of the reply to the first signal at the first transceiver unit 36. Then, at 430, the method may comprise determining a propagation delay of the second path based on determining a difference between the sixth time reference and the fifth time reference (T4, T3) taking into account the determined time offset between the first clock and the second clock. For example, from:

$$Tpath2=T4-(T3+Toff).$$

Alternatively, at 440, the method may further comprise receiving a seventh time reference (T1') representing the time of transmission of the second signal from the first transceiver unit 36 and an eighth time reference (T2') representing the time of receipt of the second signal at the second transceiver unit 38. Then, at 450, the method may comprise determining a propagation delay of the second path based on determining a difference between the eighth time reference and the seventh time reference (T2' and T1') taking into account the determined time offset between the first clock and the second clock (40). For example, from:

$$Tpath2=(T2'+Toff)-T1'.$$

Thus, advantageously, the propagation delay of the first path and/or of the second path may be determined. From these delays, an asymmetry between the propagation delay of the first path and the second path may be determined.

Alternatively, time references relating to a preceding or subsequent signal over the first path/second path may be used, together with the determined time offset between the first clock and the second clock, to determine the propagation delay of the first path and or of the second path.

As mentioned above, in this example, the first path and the second path pass through the same optical fibre 32 (along respective wavelength channels), but through respective add/drop optical filter arrangements 34. The first signal and the reply to the second signal are at a first wavelength, and the second signal and the reply to the first signal are at a second wavelength.

In this example, referring back to FIG. 2, steps 200 and 220 may therefore comprise causing the first transceiver unit to transmit the first signal at the first wavelength, and causing the first transceiver unit to transmit the second signal at the second wavelength respectively. This may be achieved, for example, by providing a control signal to the first transceiver unit 36, or by absence of providing a control signal to the first transceiver unit 36.

Figure 5:
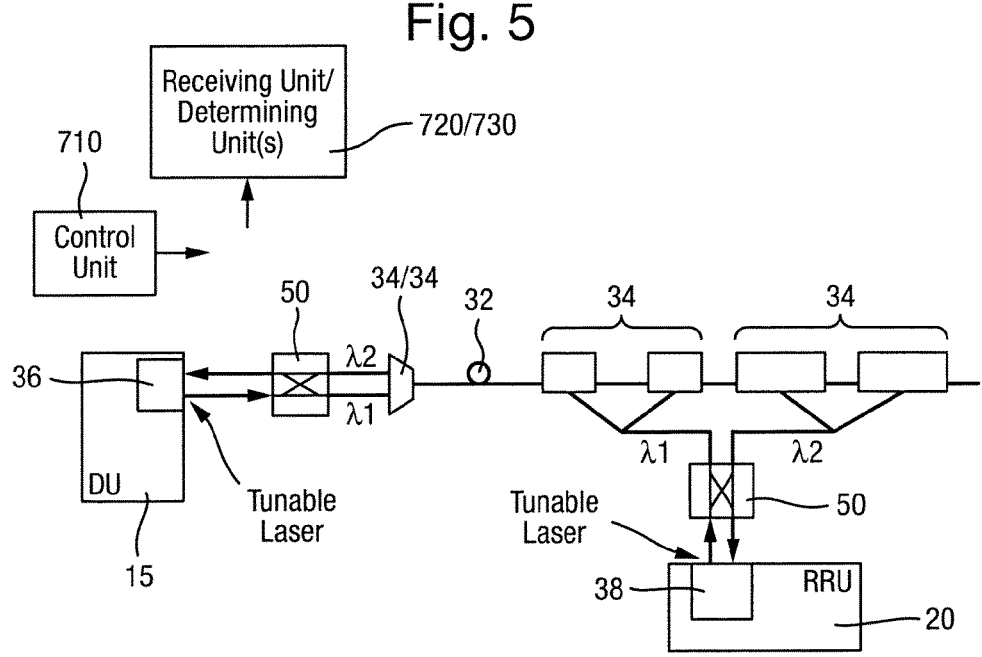
FIG. 5 illustrates an example of an implementation of the present invention according to a first embodiment.

FIG. 5 shows an example implementation of the present invention according to a first embodiment, where the first and second paths pass through the same optical fibre 32 (over respective wavelength channels) but through respective optical filter arrangements 34.

In this example, the first transceiver unit 36 is located in a first node and the second transceiver unit 38 is located in a second node of the communications network. The first and second nodes are coupled by an optical fibre 32. Each of the first and second nodes further comprise a first optical filter arrangement 34 adapted to add/drop wavelengths at a first wavelength, and a second optical filter arrangement 34 adapted to add/drop wavelengths at a second wavelength, although this is only shown clearly in FIG. 5 with respect to the second node.

In this example, each of the first and second transceiver units 36, 38 comprises a transmitter (not shown) and a receiver (not shown). In this example, each of the transmitters is a tuneable transmitter operable to transmit a signal at the first wavelength or at the second (different) wavelength.

Further, in this example each of the first and second nodes further comprises a switch arrangement 50 configured to receive the signal transmitted by the tuneable transmitter (i.e. the outgoing signal) and to selectively pass the outgoing signal over the first path or the second path. Thus, in this example, that is, to selectively pass the outgoing signal to the first optical filter arrangement 34 or to the second optical filter arrangement 34.

In this example, the switch arrangement 50 comprises three ports: a first port coupled to the tuneable transmitter, a second port coupled to the first optical filter arrangement 34, associated with the first wavelength, and a third port coupled to the second optical filter arrangement 34, associated with the second wavelength.

Thus, in this example, referring back to FIG. 2, step 200 may comprise causing the first tuneable transmitter to transmit the first signal at the first wavelength, and causing the switch arrangement 50 to selectively pass the first signal over the first path (e.g. by providing a control signal to the first tuneable transmitter/switch arrangement 50). Step 220 may similarly comprise causing the first tuneable transmitter to transmit the second signal at the second wavelength, and causing the switch arrangement 50 to selectively pass the second signal over the second path (e.g. by providing a control signal to the first tuneable transmitter/switch arrangement 50).

However, other arrangements are possible, as will be appreciated by those skilled in the art. For example, instead of a tuneable transmitter, the first and second transceiver units 36, 38 may each comprise two fixed transmitters operable to transmit a signal at the first and second wavelengths respectively, each coupled to a respective add/drop optical filter arrangement 34.

Further, in this preferred embodiment of the present invention, the switch arrangement 50 is further operable to selectively pass a signal received over the first path or the second path (in this example, from the first optical filter arrangement 34 or from the second optical filter arrangement 34) to the first transceiver unit 36.

Referring back to FIG. 2, steps 200 and 220 may further comprise causing the switch arrangement 50 to selectively pass the reply to the first signal to the first transceiver unit 36, and causing the switch arrangement 50 to selectively pass the reply to the second signal to the first transceiver unit 36.

In this particular example, the switch arrangement 50 is a 2×2 switch. The switch arrangement 50 further comprises a fourth port coupled to the receiver. The switch arrangement 50 has a first configuration in which the first port is coupled to the second port (i.e. the transmitter is coupled to the first optical filter arrangement 34), and the fourth port is coupled to the third port (i.e. the receiver is coupled to the second optical filter arrangement 34). The switch arrangement 50 has a second configuration in which the first port is coupled to the third port (i.e. the transmitter is coupled to the second optical filter arrangement 34), and the fourth port is coupled to the second port (i.e. the receiver is coupled to the first optical filter arrangement 34).

In this example, steps 200 and 220 may comprise causing the switch arrangement 50 to switch from the first state to the second state (e.g. by providing a control signal to the switch arrangement 50).

Figure 6:
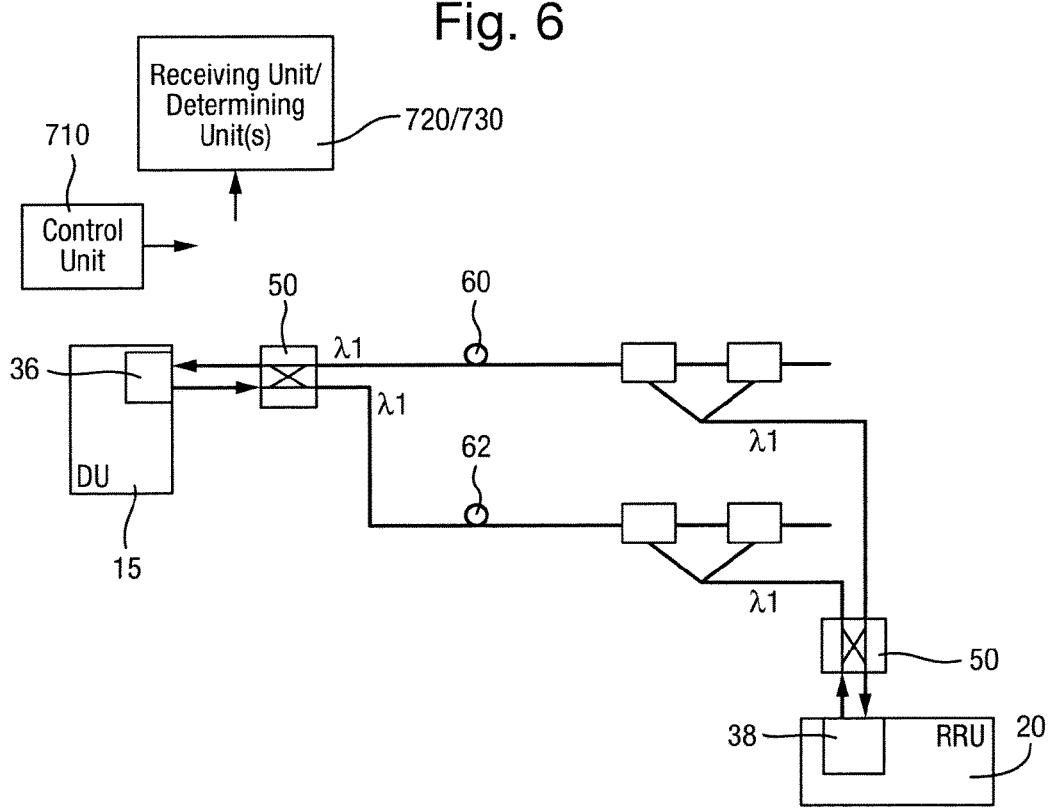
FIG. 6 illustrates an example of an implementation of the present invention according to a second embodiment.

FIG. 6 shows an alternative example implementation of the present invention according to a second embodiment. In this example, instead of passing through the same optical fibre, the first and second paths pass through respective communications links. In particular, in this example, the first path passes through a first optical fibre 60 and the second path passes through a second optical fibre 62, each coupling a first node comprising the first transceiver unit 36 to a second node comprising the second transceiver unit 38. In this example, the first and second signals (and the replies to the first and second signals) are at the same wavelength, but they could alternatively be at different wavelengths.

Similarly to the first embodiment shown in FIG. 5, in this embodiment, each of the first and second nodes may comprise a switch arrangement 50 as described above. However, in this example, the second and third ports of the switch arrangement 50 are coupled to the first and second optical fibres 60, 62 respectively.

Referring again back to FIG. 2, in this example, steps 200 and 220 may also comprise causing the switch arrangement 50 to selectively pass the first signal over the first path, and causing the switch arrangement 50 to selectively pass the second signal over the second path respectively. Further, steps 200 and 220 may also comprise causing the switch arrangement 50 to selectively pass the reply to the first signal to the first transceiver unit 36, and causing the switch arrangement 50 to selectively pass the reply to the second signal to the first transceiver unit 36, respectively.

In a preferred embodiment of the present invention, steps 200/220 may further comprise causing the second transceiver unit 38 to receive the first signal over the first path and to transmit the reply to the first signal over the second path, and to receive the second signal over the second path and to transmit the reply to the second signal over the first path. This may be achieved for example by providing a control signal to the second transceiver unit 38 (or to a switch arrangement 50 at the second node). This step has the advantage that the operation of the first transceiver unit 36 and the second transceiver unit 38 may be coordinated. However, it should be appreciated that this step may not be necessary in all embodiments of the present invention.

Figure 1:
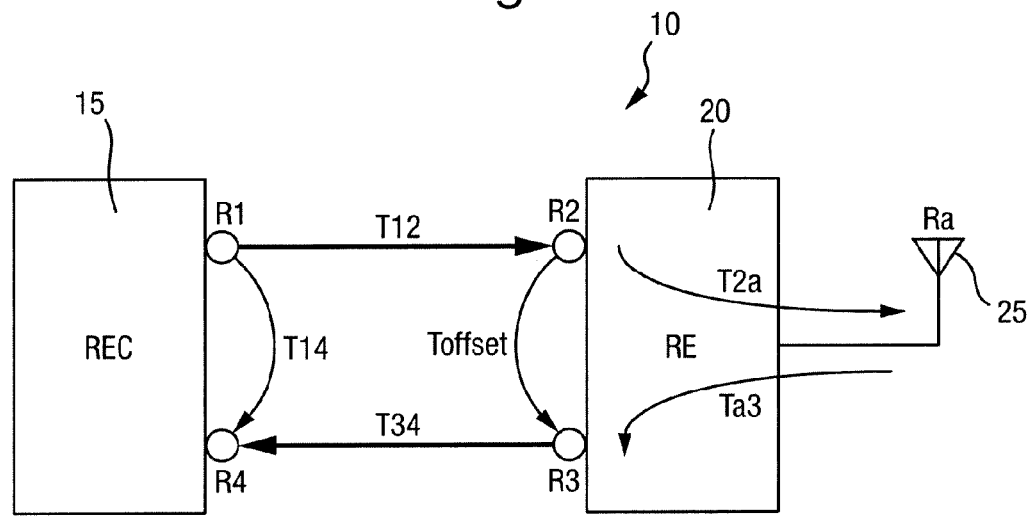
FIG. 1 illustrates a communications base station.
Figure 7:
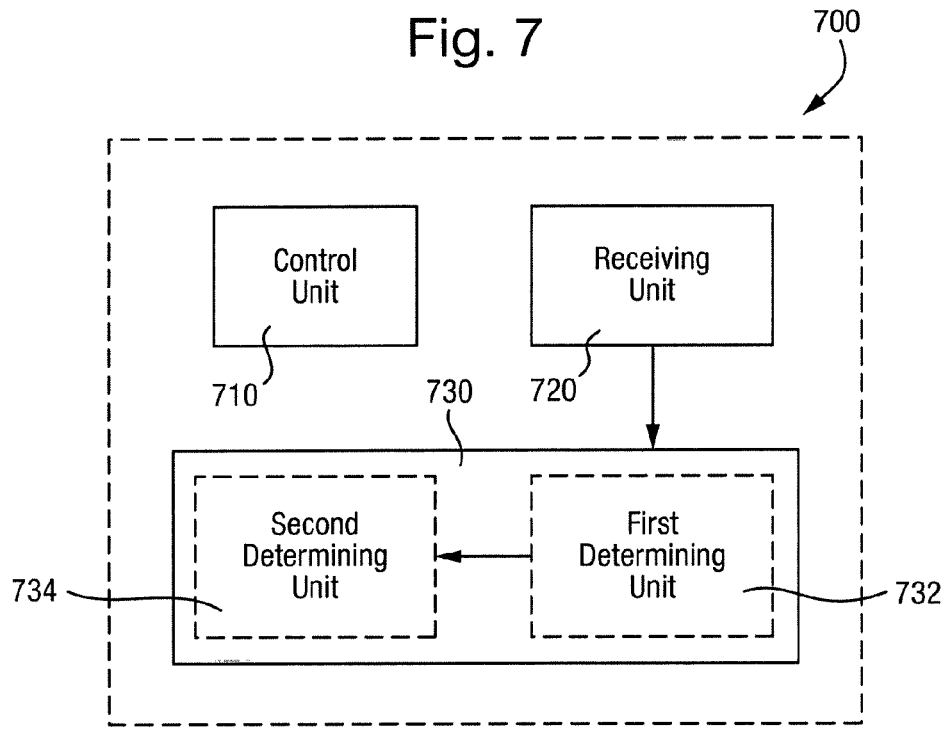
FIG. 7 is a schematic diagram of apparatus according to an embodiment of the present invention.

Apparatus 700 for determining propagation delay of a first path and or of a second path which connect a first transceiver unit, associated with a first clock, to a second transceiver unit, associated with a second clock, in a communications network, is shown in FIG. 7. The apparatus may be configured to perform any of the methods described above.

The apparatus 700 comprises a control unit 710, a receiving unit 720 and a determining unit 730. Each of the units may be implemented in hardware and or software, and may comprise more than one units integrated to any degree. Each of the units 710, 720 and 730 may comprise one or more processors (i.e. processing circuitry). The units 710, 720 and 730 may be co-located or distributed over several locations.

The control unit 710 is configured to cause the first transceiver unit to transmit a first signal to the second transceiver unit over the first path and to receive a reply to the first signal from the second transceiver unit over the second path. The control unit 710 is further configured to cause the first transceiver unit to transmit a second signal to the second transceiver unit over the second path and to receive a reply to the second signal from the second transceiver unit over the first path.

For example, the control unit 710 may be configured to cause the first transceiver unit to transmit the first signal at a first wavelength and to transmit the second signal at a second, different wavelength. In addition or alternatively, the control unit 710 may be configured to cause a switch arrangement to selectively pass the first signal over the first path and to selectively pass the second signal over the second path. Further, the control unit 710 may be configured to cause a switch arrangement to selectively pass the reply to the first signal to the first transceiver unit, and to selectively pass the reply to the second signal to the first transceiver unit. The control unit 710 may further be configured to cause the second transceiver unit to receive the first signal over the first path and to transmit the reply to the first signal over the second path, and to receive the second signal over the second path and to transmit the reply to the second signal over the first path.

The receiving unit 720 is configured to receive a first time reference representing the time of transmission of the first signal from the first transceiver unit, a second time reference representing the time of receipt of the first signal at the second transceiver unit, a third time reference representing the time of transmission of the reply to the second signal from the second transceiver unit and a fourth time reference representing the time of receipt of the reply to the second signal at the first transceiver unit.

In an embodiment, the receiving unit 720 may further be configured to receive a fifth time reference representing the time of transmission of the reply to the first signal from the second transceiver unit and a sixth time reference representing the time of receipt of the reply to the first signal at the first transceiver unit, and/or to receive a seventh time reference representing the time of transmission of the second signal from the first transceiver unit and an eighth time reference representing the time of receipt of the second signal at the second transceiver unit.

The determining unit 730 is configured to determine a propagation delay of the first path and or of the second path using the first time reference, the second time reference, the third time reference and the fourth time reference.

In a preferred embodiment, the determining unit 730 may comprise a first determining unit 732 and a second determining unit 734. The first determining unit may be configured to determine a time offset between the first clock and the second clock using the first time reference, the second time reference, the third time reference and the fourth time reference. The second determining unit may be configured to determine the propagation delay of the first path and or of the second path taking into account the determined time offset between the first clock and the second clock.

The second determining unit 734 may be configured to determine the propagation delay of the first path by determining a difference between the second time reference and the first time reference taking into account the determined time offset between the first clock and the second clock, or by determining a difference between the fourth time reference and the third time reference taking into account the determined time offset between the first clock and the second clock.

In addition or alternatively, the second determining unit 734 may be configured to determine the propagation delay of the second path by determining a difference between the sixth time reference and the fifth time reference taking into account the determined time offset between the first clock and the second clock, or by determining a difference between the eighth time reference and the seventh time reference taking into account the determined time offset between the first clock and the second clock.

As indicated in FIGS. 3, 6 and 7 the apparatus 700 may be located at a node in the communications network, in particular at a node comprising the first transceiver unit 36. This may provide a cost effective implementation, which reduces the bandwidth required to transmit or pass the necessary time references to the receiving unit 720. However, the apparatus 700 may be located at a node other than the node comprising the first transceiver unit 36, or at a different location.

In the above examples, the apparatus may be located in or may be part of a communications base station 10. The first transceiver unit 36 may be associated with an REC 15, and the second transceiver unit 38 may be associated with an RE 20. The first signal, the reply to the first signal, the second signal and the reply to the second signal may be CPRI signals.

However, it should be appreciated that embodiments of the present invention may be used in other applications, where it is desired to determine the propagation delay of a first path and or of a second path which connect a first transceiver unit, associated with a first clock, to a second transceiver unit, associated with a second clock, in a communications network.

Further, it should be appreciated that, although in embodiments of the present invention described above the communications network is an optical communications network, the communications network may be any type of suitable communications network, for example but limited to, a wired network or a radio network.

The invention claimed is:

1. A method for determining propagation delay of a first path that connects a first transceiver unit associated with a first clock to a second transceiver unit associated with a second clock in a communications network, the method comprising:
    causing the first transceiver unit to transmit a first signal to the second transceiver unit over the first path and to receive a reply to the first signal from the second transceiver unit over a second path that also connects the first transceiver unit to the second transceiver unit, and to transmit a second signal to the second transceiver unit over the second path and to receive a reply to the second signal from the second transceiver unit over the first path;
    receiving a first time reference representing the time of transmission of the first signal from the first transceiver unit, a second time reference representing the time of receipt of the first signal at the second transceiver unit, a third time reference representing the time of trans-
    mission of the reply to the second signal from the second transceiver unit and a fourth time reference representing the time of receipt of the reply to the second signal at the first transceiver unit;
    determining a time offset between the first clock and the second clock using the first time reference, the second time reference, the third time reference and the fourth time reference; and
    determining the propagation delay of the first path by determining a difference between the second time reference and the first time reference taking into account the determined time offset between the first clock and the second clock, or by determining a difference between the fourth time reference and the third time reference taking into account the determined time offset between the first clock and the second clock.

2. The method of claim 1, further comprising:
    receiving a fifth time reference representing the time of transmission of the reply to the first signal from the second transceiver unit and a sixth time reference representing the time of receipt of the reply to the first signal at the first transceiver unit, or receiving a seventh time reference representing the time of transmission of the second signal from the first transceiver unit and an eighth time reference representing the time of receipt of the second signal at the second transceiver unit; and
    determining the propagation delay of the second path by determining a difference between the sixth time reference and the fifth time reference taking into account the determined time offset between the first clock and the second clock, or by determining a difference between the eighth time reference and the seventh time reference taking into account the determined time offset between the first clock and the second clock.

3. The method of claim 1, wherein the second time reference is transmitted from the second transceiver unit to the first transceiver unit in the reply to the first signal and the third time reference is transmitted from the second transceiver unit to the first transceiver unit in the reply to the second signal.

4. The method of claim 1, wherein the first signal, the reply to the first signal, the second signal and the reply to the second signal comprise CPRI (Common Public Radio Interface) signals.

5. An apparatus for determining propagation delay of a first path that connects a first transceiver unit associated with a first clock to a second transceiver unit associated with a second clock in a communications network, the apparatus comprising:
    a control unit configured to cause the first transceiver unit to transmit a first signal to the second transceiver unit over the first path and to receive a reply to the first signal from the second transceiver unit over a second path that also connects the first transceiver unit to the second transceiver unit, and to transmit a second signal to the second transceiver unit over the second path and to receive a reply to the second signal from the second transceiver unit over the first path;
    a receiving unit configured to receive a first time reference representing the time of transmission of the first signal from the first transceiver unit, a second time reference representing the time of receipt of the first signal at the second transceiver unit, a third time reference representing the time of transmission of the reply to the second signal from the second transceiver unit and a fourth time reference representing the time of receipt of the reply to the second signal at the first transceiver unit;
a first determining unit configured to determine a time offset between the first clock and the second clock using the first time reference, the second time reference, the third time reference and the fourth time reference; and
a second determining unit configured to determine the propagation delay of the first path, by determining a difference between the second time reference and the first time reference taking into account the determined time offset between the first clock and the second clock, or by determining a difference between the fourth time reference and the third time reference taking into account the determined time offset between the first clock and the second clock.

6. The apparatus of claim 5,
wherein the receiving unit is further configured to receive a fifth time reference representing the time of transmission of the reply to the first signal from the second transceiver unit and a sixth time reference representing the time of receipt of the reply to the first signal at the first transceiver unit, or to receive a seventh time reference representing the time of transmission of the second signal from the first transceiver unit and an eighth time reference representing the time of receipt of the second signal at the second transceiver unit; and
wherein the second determining unit is further configured to determine the propagation delay of the second path, by determining a difference between the sixth time reference and the fifth time reference taking into account the determined time offset between the first clock and the second clock, or by determining a difference between the eighth time reference and the seventh time reference taking into account the determined time offset between the first clock and the second clock.

7. The apparatus of claim 5, wherein the control unit is configured to cause the first transceiver unit to transmit the first signal at a first wavelength and to transmit the second signal at a second, different wavelength.

8. The apparatus of claim 5, wherein the control unit is configured to cause a switch arrangement to selectively pass the first signal over the first path and to selectively pass the second signal over the second path.

9. The apparatus of claim 5, wherein the control unit is configured to cause a switch arrangement to selectively pass the reply to the first signal, received over the second path, to the first transceiver unit, and to selectively pass the reply to the second signal, received over the first path, to the first transceiver unit.

10. The apparatus of claim 5, wherein the control unit is further configured to cause the second transceiver unit to receive the first signal over the first path and to transmit the reply to the first signal over the second path, and to receive the second signal over the second path and to transmit the reply to the second signal over the first path.

11. A node for a communications network, the node comprising the apparatus of claim 5.

12. The node of claim 11, wherein the node is a communications base station.

13. A non-transitory computer-readable medium comprising, stored thereupon, a computer program product configured to, when run on a computer, perform a method for determining propagation delay of a first path that connects a first transceiver unit associated with a first clock to a second transceiver unit associated with a second clock in a communications network, wherein the method comprises:
causing the first transceiver unit to transmit a first signal to the second transceiver unit over the first path and to receive a reply to the first signal from the second transceiver unit over a second path that also connects the first transceiver unit to the second transceiver unit, and to transmit a second signal to the second transceiver unit over the second path and to receive a reply to the second signal from the second transceiver unit over the first path;
receiving a first time reference representing the time of transmission of the first signal from the first transceiver unit, a second time reference representing the time of receipt of the first signal at the second transceiver unit, a third time reference representing the time of transmission of the reply to the second signal from the second transceiver unit and a fourth time reference representing the time of receipt of the reply to the second signal at the first transceiver unit;
determining a time offset between the first clock and the second clock using the first time reference, the second time reference, the third time reference and the fourth time reference; and
determining the propagation delay of the first path by determining a difference between the second time reference and the first time reference taking into account the determined time offset between the first clock and the second clock, or by determining a difference between the fourth time reference and the third time reference taking into account the determined time offset between the first clock and the second clock.

14. A method for determining propagation delay of a second path that connects a first transceiver unit associated with a first clock to a second transceiver unit associated with a second clock in a communications network, the method comprising:
causing the first transceiver unit to transmit a first signal to the second transceiver unit over a first path that connects the first transceiver unit to the second transceiver unit, and to receive a reply to the first signal from the second transceiver unit over the second path, and to transmit a second signal to the second transceiver unit over the second path and to receive a reply to the second signal from the second transceiver unit over the first path;
receiving a first time reference representing the time of transmission of the first signal from the first transceiver unit, a second time reference representing the time of receipt of the first signal at the second transceiver unit, a third time reference representing the time of transmission of the reply to the second signal from the second transceiver unit and a fourth time reference representing the time of receipt of the reply to the second signal at the first transceiver unit;
determining a time offset between the first clock and the second clock using the first time reference, the second time reference, the third time reference and the fourth time reference;
receiving a fifth time reference representing the time of transmission of the reply to the first signal from the second transceiver unit and a sixth time reference representing the time of receipt of the reply to the first signal at the first transceiver unit, or receiving a seventh time reference representing the time of transmission of the second signal from the first transceiver unit and an eighth time reference representing the time of receipt of the second signal at the second transceiver unit; and determining the propagation delay of the second path by determining a difference between the sixth time reference and the fifth time reference taking into account the determined time offset between the first clock and the second clock, or by determining a difference between the eighth time reference and the seventh time reference taking into account the determined time offset between the first clock and the second clock.

15. The method of claim 14, further comprising:

determining the propagation delay of the first path by determining a difference between the second time reference and the first time reference taking into account the determined time offset between the first clock and the second clock, or by determining a difference between the fourth time reference and the third time reference taking into account the determined time offset between the first clock and the second clock.

16. The method of claim 14, wherein the second time reference is transmitted from the second transceiver unit to the first transceiver unit in the reply to the first signal and the third time reference is transmitted from the second transceiver unit to the first transceiver unit in the reply to the second signal.

17. The method of claim 14, wherein the first signal, the reply to the first signal, the second signal and the reply to the second signal comprise CPRI (Common Public Radio Interface) signals.

18. An apparatus for determining propagation delay of a second path that connects a first transceiver unit associated with a first clock to a second transceiver unit associated with a second clock in a communications network, the apparatus comprising:

a control unit configured to cause the first transceiver unit to transmit a first signal to the second transceiver unit over the first path and to receive a reply to the first signal from the second transceiver unit over a second path that also connects the first transceiver unit to the second transceiver unit, and to transmit a second signal to the second transceiver unit over the second path and to receive a reply to the second signal from the second transceiver unit over the first path;

a receiving unit configured to receive
a first time reference representing the time of transmission of the first signal from the first transceiver unit, a second time reference representing the time of receipt of the first signal at the second transceiver unit, a third time reference representing the time of transmission of the reply to the second signal from the second transceiver unit and a fourth time reference representing the time of receipt of the reply to the second signal at the first transceiver unit, and
a fifth time reference representing the time of transmission of the reply to the first signal from the second transceiver unit and a sixth time reference representing the time of receipt of the reply to the first signal at the first transceiver unit, or to receive a seventh time reference representing the time of transmission of the second signal from the first transceiver unit and an eighth time reference representing the time of receipt of the second signal at the second transceiver unit;

a first determining unit configured to determine a time offset between the first clock and the second clock using the first time reference, the second time reference, the third time reference and the fourth time reference; and a second determining unit configured to determine the propagation delay of the second path, by determining a difference between the sixth time reference and the fifth time reference taking into account the determined time offset between the first clock and the second clock, or by determining a difference between the eighth time reference and the seventh time reference taking into account the determined time offset between the first clock and the second clock.

19. The apparatus of claim 18, wherein the second determining unit is further configured to:

determine the propagation delay of the first path, by determining a difference between the second time reference and the first time reference taking into account the determined time offset between the first clock and the second clock, or by determining a difference between the fourth time reference and the third time reference taking into account the determined time offset between the first clock and the second clock.

20. The apparatus of claim 18, wherein the control unit is configured to cause the first transceiver unit to transmit the first signal at a first wavelength and to transmit the second signal at a second, different wavelength.

21. The apparatus of claim 18, wherein the control unit is configured to cause a switch arrangement to selectively pass the first signal over the first path and to selectively pass the second signal over the second path.

22. The apparatus of claim 18, wherein the control unit is configured to cause a switch arrangement to selectively pass the reply to the first signal, received over the second path, to the first transceiver unit, and to selectively pass the reply to the second signal, received over the first path, to the first transceiver unit.

23. The apparatus of claim 18, wherein the control unit is further configured to cause the second transceiver unit to receive the first signal over the first path and to transmit the reply to the first signal over the second path, and to receive the second signal over the second path and to transmit the reply to the second signal over the first path.

24. A node for a communications network, the node comprising the apparatus of claim 18.

25. The node of claim 24, wherein the node is a communications base station.

* * * * *